United States Patent
Horikoshi et al.

(10) Patent No.: US 10,714,746 B2
(45) Date of Patent: Jul. 14, 2020

(54) CONDUCTIVE COMPOSITION FOR ELECTRODE, ELECTRODE USING SAME, AND LITHIUM ION SECONDARY BATTERY

(71) Applicant: Denka Company Limited, Chuo-ku, Tokyo (JP)

(72) Inventors: Yoko Horikoshi, Machida (JP); Toru Arai, Chuo-ku (JP); Hitoshi Kaneko, Machida (JP); Tatsuya Nagai, Machida (JP); Ayumu Tsukamoto, Machida (JP)

(73) Assignee: Denka Company Limited, Chuo-ku, Tokyo (JP)

( * ) Notice: Subject to any disclaimer, the term of this patent is extended or adjusted under 35 U.S.C. 154(b) by 109 days.

(21) Appl. No.: 15/503,362

(22) PCT Filed: Aug. 6, 2015

(86) PCT No.: PCT/JP2015/072387
§ 371 (c)(1),
(2) Date: Feb. 10, 2017

(87) PCT Pub. No.: WO2016/024525
PCT Pub. Date: Feb. 18, 2016

(65) Prior Publication Data
US 2017/0288218 A1    Oct. 5, 2017

(30) Foreign Application Priority Data
Aug. 11, 2014   (JP) .................. 2014-163905

(51) Int. Cl.
*H01B 1/24* (2006.01)
*H01M 4/00* (2006.01)
(Continued)

(52) U.S. Cl.
CPC ............. *H01M 4/405* (2013.01); *C01B 32/05* (2017.08); *C09D 127/16* (2013.01);
(Continued)

(58) Field of Classification Search
CPC ........... H01B 1/24; C08L 101/02; C08K 3/04; C01B 32/15; H01M 4/36; H01M 4/624; H01M 4/625
See application file for complete search history.

(56) References Cited

U.S. PATENT DOCUMENTS 9,738,993 B2 * 8/2017 Kaneko .................. B01J 21/10
2011/0003151 A1   1/2011 Nishio et al.
(Continued)

FOREIGN PATENT DOCUMENTS

CN    103524790 A    1/2014
CN    103626149 A    3/2014
(Continued)

OTHER PUBLICATIONS

Staudinger et al "Dispersability of multiwalled carbon nanotubes in polycarbonate chloroform solutions", Polymer 55 (2014) 6335-6344. (Year: 2014) (Year: 2014).*
(Continued)

*Primary Examiner* — Mark Kopec
(74) *Attorney, Agent, or Firm* — Christensen O'Connor Johnson Kindness PLLC

(57) ABSTRACT

A conductive composition for electrode is provided that is excellent in conductivity and dispersibility. Further, an electrode for lithium ion secondary battery with lower plate resistance and a lithium ion secondary battery excellent in rate characteristics are provided that use this conductive composition. A conductive composition for electrode, including: carbon nanofiber with a median diameter D50 value by volume from 0.1 to 8 pm; an active material; and a binder enables production of an electrode for lithium ion secondary battery with lower plate resistance and a lithium ion secondary battery excellent in rate characteristics.

7 Claims, 3 Drawing Sheets

(51) Int. Cl.

| | | |
|---|---|---|
| *H01M 4/40* | (2006.01) | |
| *H01M 4/525* | (2010.01) | |
| *C01B 32/05* | (2017.01) | |
| *H01M 4/62* | (2006.01) | |
| *C09D 127/16* | (2006.01) | |
| *C09D 129/04* | (2006.01) | |
| *C09D 127/18* | (2006.01) | |
| *H01M 4/38* | (2006.01) | |
| *H01M 10/052* | (2010.01) | |
| *B82Y 40/00* | (2011.01) | |
| *B82Y 30/00* | (2011.01) | |
| *H01M 4/131* | (2010.01) | |
| *C08F 14/26* | (2006.01) | |
| *C08F 20/06* | (2006.01) | |
| *C08L 9/06* | (2006.01) | |

(52) U.S. Cl.
 CPC ......... *C09D 127/18* (2013.01); *C09D 129/04* (2013.01); *H01B 1/24* (2013.01); *H01M 4/386* (2013.01); *H01M 4/525* (2013.01); *H01M 4/623* (2013.01); *H01M 4/625* (2013.01); *H01M 10/052* (2013.01); *B82Y 30/00* (2013.01); *B82Y 40/00* (2013.01); *C08F 14/26* (2013.01); *C08F 20/06* (2013.01); *C08L 9/06* (2013.01); *H01M 4/131* (2013.01)

(56) References Cited

U.S. PATENT DOCUMENTS

| | | | | |
|---|---|---|---|---|
| 2013/0224588 A1* | 8/2013 | Kageura | ............... | H01M 4/131 429/211 |
| 2014/0001416 A1* | 1/2014 | Fiffemeier | .......... | H01M 4/1393 252/511 |
| 2014/0010749 A1* | 1/2014 | Nakamura | ............. | D01G 13/00 423/447.1 |
| 2014/0011092 A1 | 1/2014 | Yamamoto et al. | | |
| 2014/0054179 A1* | 2/2014 | Yamamoto | ............ | H01G 11/40 205/560 |
| 2014/0272596 A1* | 9/2014 | Yamamoto | ............ | H01M 4/625 429/232 |
| 2014/0329093 A1 | 11/2014 | Nishio et al. | | |
| 2015/0118555 A1* | 4/2015 | Akikusa | ................ | H01M 4/505 429/217 |
| 2015/0303480 A1* | 10/2015 | Hanazaki | ............ | H01M 4/1391 429/217 |
| 2016/0111626 A1* | 4/2016 | Takagaki | ............. | C08L 101/02 310/363 |
| 2017/0288218 A1* | 10/2017 | Horikoshi | ............. | H01M 4/525 |

FOREIGN PATENT DOCUMENTS

| | | |
|---|---|---|
| CN | 104051736 A | 9/2014 |
| JP | 2004-299986 A | 10/2004 |
| JP | 2004-300631 A | 10/2004 |
| JP | 2006-152490 A | 6/2006 |
| JP | 2009-16265 A | 1/2009 |
| JP | 2012-33440 A | 2/2012 |
| JP | 2013-41704 A | 2/2013 |
| JP | 2013-77479 A | 4/2013 |
| JP | 2014-13671 A | 1/2014 |
| WO | 2009/110570 A1 | 9/2009 |
| WO | 2012/053334 A1 | 4/2012 |

OTHER PUBLICATIONS

International Search Report dated Oct. 6, 2015, issued in corresponding International Application No. PCT/JP2015/072387, filed Aug. 6, 2015, 1 page.

Chinese Office Action for corresponding CN2015800550377, dated Aug. 21, 2019, 11 pages with English Translation.

* cited by examiner

CONDUCTIVE COMPOSITION FOR ELECTRODE, ELECTRODE USING SAME, AND LITHIUM ION SECONDARY BATTERY

TECHNICAL FIELD

The present invention relates to a conductive composition for electrode, and an electrode and a lithium ion secondary battery using the same

BACKGROUND ART

Cathodes and anodes for lithium ion secondary battery are produced by coating metal foil with an electrode slurry formulated with a conductive agent, an active material, and a binder. The electrode slurry in this context refers to a slurry with a conductive agent, an active material, and a binder mixed in a solvent.

As the conductive agent, adjacent carbon powder with excellent electronic conductivity, such as carbon black (hereinafter, referred to as CB), is used. As the binder, styrene-butadiene rubber (hereinafter, referred to as SBR) is used for an aqueous solvent and polyvinylidene fluoride (hereinafter, referred to as PVdF) for an organic solvent such as N-methylpyrrolidone (hereinafter, referred to as NMP).

To improve the charge and discharge characteristics of various batteries, particularly lithium ion secondary batteries, a conductive carbon material of carbon nanofiber (hereinafter, referred to as CNF) and a mixture of CB and CNF are used as an electrode conductive agent. Use or addition of CNF is characterized in that high electric conductivity is obtained with relatively low conductive carbon material content. Such characteristics raise expectations. The CNF here generally has a fibrous shape with an outer diameter from 5 to 100 nm and an aspect ratio, indicating a ratio of a fiber length to the outer diameter, of 10 or more.

Conventional production of CNF includes electrode discharge machining, catalytic vapor deposition, the laser technique, and the like. Among them, catalytic vapor deposition is considered to be most suitable as an industrial production method. In the catalytic vapor deposition, transition metal particles are used as a catalyst to make contact a raw material gas as a carbon source, such as acetylene and benzene, thereby growing CNF from catalyst particles generally at high temperatures of 900° C. or more. In particular, methods of producing CNF from a gas as a raw material containing carbon monoxide as a main component by using a transition metal component, such as cobalt, as a catalyst gain attention as a method of producing high purity and high quality CNF at relatively low temperatures (PTLs 1 to 5).

To use CNF as a conductivity imparting agent for lithium ion secondary battery, dispersibility of CNF is important. For a better state of CNF dispersion in the electrode, there is a method of inhibiting aggregation of CNF by dry mixing an active material and carbon fiber and then mixing the dry mixture, a binder, and a solvent (PTL 6).

For a better state of CNF dispersion in the electrode, there is another method of uniform dispersion in a solvent by surface oxidation process to CNF using concentrated nitric acid and concentrated sulfuric acid (PTL 7).

CITATION LIST

Patent Literatures

PTL 1: JP 2004-299986A
PTL 2: JP 2004-300631A
PTL 3: JP 2006-152490A
PTL 4: WO 2009/110570 re-published in Japanese
PTL 5: WO 2012/053334 re-published in Japanese
PTL 6: JP 2009-16265A
PTL 7: JP 2013-77479A

SUMMARY OF THE INVENTION

Technical Problem

The above related techniques unfortunately have room for further improvement in the following points.

In the first place, the yield and the activity of CNF produced by the method of producing CNF from a gas containing carbon monoxide as a main component are not sufficient and higher catalytic activity is demanded. To use CNF produced therefrom as a conductive agent, CNF is required to have even higher electric conductivity (lower powder resistivity).

Fine carbon fiber such as conventional CNF has poor dispersibility due to a secondary structure formed by the fiber complexly entangled with each other, causing a problem of an increase in costs for dispersion. Specifically, in the method of PTL 6, it has been difficult to completely uniformly disperse CNF in an electrode slurry. Because of the insufficient dispersion, CNF in the electrode slurry has to be increased parts by mass to maintain the performance as a conductive agent, leading to problems of a decrease in active material in the electrode and a decrease in capacity. In the method using mixed acid of PTL 7, there are problems of a decrease in conductivity of CNF due to the surface oxidation and an increase in cost for the facilities and processing due to the use of strong acids of concentrated nitric acid and concentrated sulfuric acid.

In view of such circumstances, it is an object of the present invention to provide a conductive composition for electrode containing CNF with a particular structure and excellent in conductivity and dispersibility. It is a further object to provide an electrode for lithium ion secondary battery and a lithium ion secondary battery that use the conductive composition for electrode.

Solution to Problem

That is, the present invention to solve the above problems is configured as follows.

(1) A conductive composition for electrode, including: carbon nanofiber with a median diameter D50 value by volume from 0.1 to 8 μm; an active material; and a binder.

(2) The composition of (1), wherein the carbon nanofiber further has powder resistivity of, measured under a load of 9.8 MPa, 0.03 Ωcm or less and D/G from 0.5 to 1.3.

(3) The composition of (1) or (2), wherein a content of the carbon nanofiber is from 0.1 to 2 mass % based on a sum total of the composition.

(4) The composition of any one of (1) to (3), wherein the active material is selected from any one or more of $LiCoO_2$, $LiMn_2O_4$, $LiNiO_2$, $LiMPO_4$, $Li_2MSiO_4$, $LiNi_xMn_{(2-x)}O_4$, $Li(Mn_xNi_yCo_z)O_2$, $Li(Al_xNi_yCo_z)O_2$, and $Li_2MnO_3$-(1-x)$LiMO_2$, where X in $LiNi_xMn_{(2-x)}O_4$ satisfies relationship of $0<X<2$, X, Y, and Z in $Li(Mn_xNi_yCo_z)O_2$ or $Li(Al_xNi_yCo_z)O_2$ satisfy relationship of $X+Y+Z=1$ and also satisfy relationship of $0<X<1$, $0<Y<1$, and $0<Z<1$, x in $xLi_2MnO_3$-(1-x)$LiMO_2$ satisfies relationship of $0<x<1$, and M in $LiMPO_4$, $Li_2MSiO_4$, or $xLi_2MnO_3$-(1-x)$LiMO_2$ is one or more elements selected from Fe, Co, Ni, and Mn.

(5) The composition of any one of (1) to (4), wherein the binder is selected from any one or more of polyvinylidene fluoride, polytetrafluoroethylene, a styrene-butadiene copolymer, a (meth)acrylate copolymer, polyvinyl alcohol, and a copolymer of polyvinyl alcohol and polyacrylonitrile.

(6) The composition of any one of (1) to (5), wherein the carbon nanofiber is carbon nanofiber produced using a catalyst having an active species containing cobalt as a main component, and using carbon monoxide as a carbon source, the catalyst has the active species from 3 to 150 mass % supported on a carrier of a magnesium-containing oxide with a specific surface area from 0.01 to 5 $m^2/g$, and the carbon nanofiber is produced in conditions of a reaction temperature from 670° C. to 780° C., a carbon monoxide partial pressure from 0.04 to 0.98 MPa, a hydrogen partial pressure from 1% to 100% based on the carbon monoxide partial pressure, and a carbon monoxide gas flow rate of 1 NL/g-active species min. or more.

(7) An electrode for lithium ion secondary battery, including the composition of any one of (1) to (6).

(8) A lithium ion secondary battery, including the electrode for lithium ion secondary battery of (7).

Advantageous Effects of Invention

In the present invention, it was found that CNF with a median diameter D50 value by volume ranging from 0.1 to 8 μm is used to produce a conductive composition for electrode excellent in conductivity and dispersibility. The conductive composition for electrode of the present invention has an improved conductive network because of the improvement in dispersibility and thus has a lowplate resistance when used as an electrode for lithium ion secondary battery.

DESCRIPTION OF EMBODIMENTS

Carbon Nanofiber

CNF herein is defined to have an average outer diameter from 5 to 100 nm, preferably from 5 to 50 nm, and an aspect ratio, indicating a ratio of a fiber length to the outer diameter, of 10 or more and is a concept involving multiwalled carbon nanotubes (hereinafter, referred to as MWCNT), which more preferably contains MWCNT as a main component. MWCNT has an outer diameter of roughly 5 nm or more. A too large outer diameter, for example more than 50 nm, may cause a decrease in the number of MWCNT per unit weight and thus difficulty in forming a conductive network.

Figure 1:
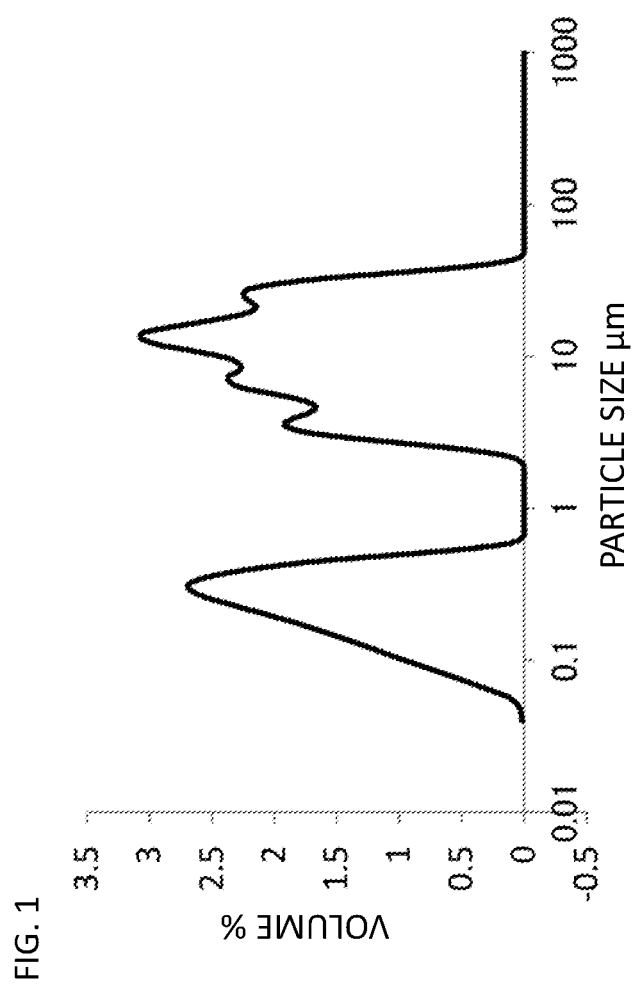
FIG. 1 is a particle size distribution graph of CNF used in Example 1.
Figure 2:
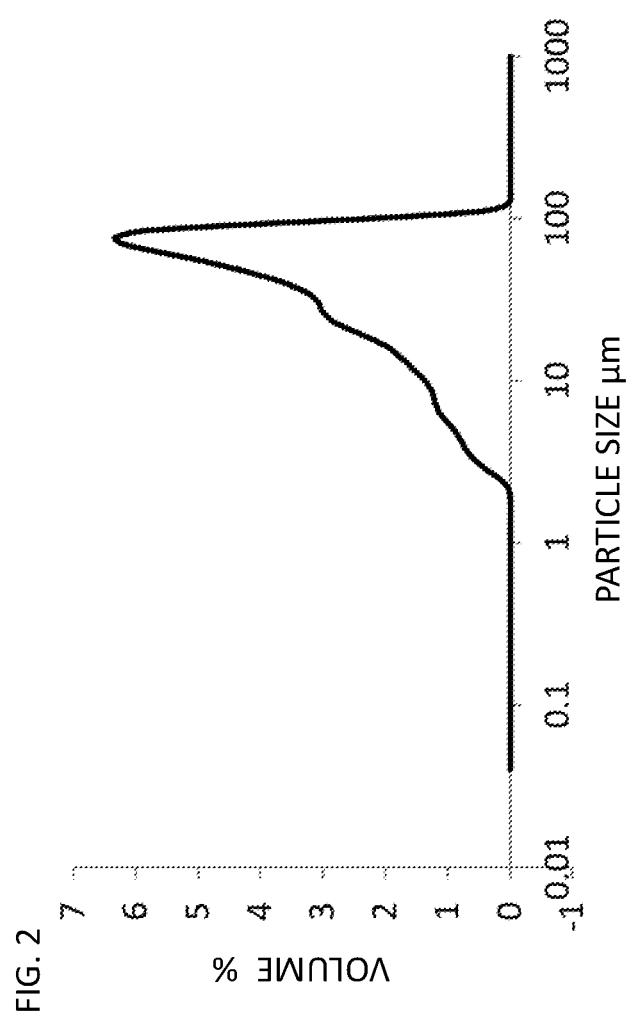
FIG. 2 is a particle size distribution graph of CNF used in Comparative Example 1.
Figure 3:
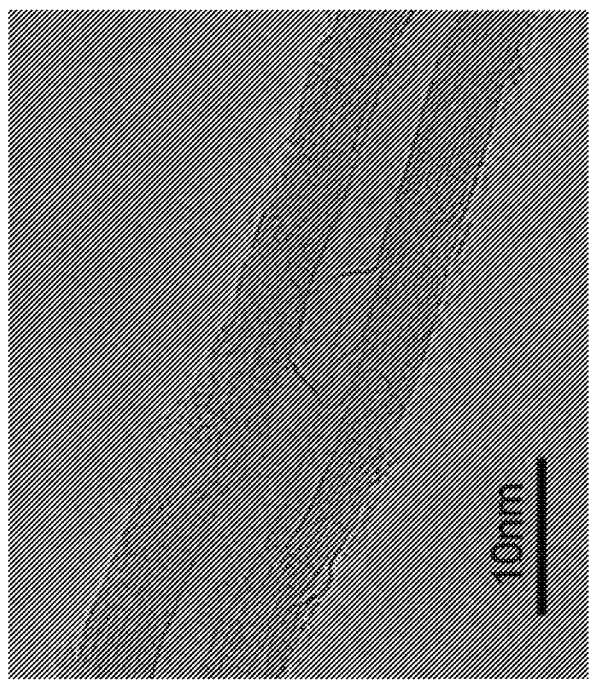
FIG. 3 is a TEM picture of the CNF used in Example 1.

The definition of CNF herein does not include single wall carbon nanotubes (hereinafter, referred to as SWCNT). While being characterized in that high conductivity is exhibited, SWCNT is not the subject of the present invention because it has practical problems such as the presence of an isomer by the chirality and has a rigid bundle structure, resulting in difficulty in dispersion. As CNF herein, MWCNT is most preferred. FIG. 3 illustrates a TEM picture of CNF used in Example 1 as a representative example of carbon nanofiber of the present invention. The picture illustrates that it was MWCNT.

Synthetic activity herein is the mass of CNF produced per unit mass of active species and per unit time. The catalytic activity herein is the mass of CNF produced per unit catalyst mass and per unit time. The active species here is metal containing cobalt as a main component.

In addition, a carrier means an oxide to support the active species.

CNF in the present invention has a median diameter D50 value by volume from 0.1 to 8 μm, preferably from 0.1 to 3 μm, and most preferably from 0.1 to 1 μm. The median diameter in this context may be obtained by irradiating CNF particles with laser light to convert the CNF diameter to a spherical shape using the scattered light. A greater median diameter means the presence of more CNF aggregates and poorer dispersion. A median diameter D50 value more than 8 μm causes greater possibility of presence of CNF aggregates in the electrode, leading to non-uniform conductivity in the entire electrode. As a result, the capacity and the rate characteristics as an electrode for lithium ion secondary battery turn out to decrease. In contrast, CNF with a median diameter D50 value of less than 0.1 μm has short fiber and has increased contact points when forming a conductive path between the active material and the collector to increase contact resistance and decrease the high conductivity. The median diameter D50 value ranging from 0.1 to 8 μm enables uniform dispersion of the CNF in the electrode while the conductivity is maintained. The median diameter D50 value may range between two values arbitrarily selected from 0.1, 0.2, 0.3, 0.4, 0.5, 0.6, 0.7, 0.8, 0.9, 1, 2, 3, 4, 5, 6, 7, and 8 μm.

The CNF of the present invention has a D/G value obtained by Raman spectrometry from 0.5 to 1.3 and preferably from 0.5 to 1.0. The CNF with a D/G value ranging from 0.5 to 1.3 is excellent in conductivity and crystallinity. The D/G value here can be obtained from a ratio of, by Raman spectrometry of CNF powder, the total area derived from the D band peak to the total area derived from the G band peak. A lower D/G value indicates higher crystallinity of the CNF and means higher conductivity of the CNF. An increased D/G increases bending of the CNF, causing CNFs more complexly entangled with each other. The dispersibility to a polymer material is thus prone to decrease and to increase the powder resistivity of the CNF. However, a smaller D/G requires an additional processing step to improve the crystallinity, and it has been difficult to readily produce CNF excellent in crystallinity. In contrast, the method of using a catalyst of the present invention is capable of efficiently producing CNF excellent in crystallinity with D/G from 0.5 to 1.3. The CNF having excellent dispersibility, conductive, and crystallinity by the catalyst of the present invention is used to produce a conductive polymer material more excellent in conductivity. CNF with D/G of more than 1.3 and increased bending may cause an increase in powder resistivity due to a decrease in dispersibility. It is also known that synthesis of MWCNT with D/G of less than 0.5 is difficult unless the crystallinity is improved by a graphitization process or the like. The D/G may range between two values arbitrarily selected from 0.5, 0.6, 0.7, 0.8, 0.9, 1.0, 1.1, 1.2, and 1.3.

The CNF has powder resistivity of, measured under a load of 9.8 MPa, 0.03 Ωcm or less. Powder resistivity of more than 0.03 Ωcm causes a decrease in conductivity between the active material and the electrode. The powder resistivity may be any value selected from 0.015, 0.016, 0.017, 0.018, 0.019, 0.020, 0.021, 0.022, 0.023, 0.024, 0.025, 0.026, 0.027, 0.028, 0.029, and 0.030 Ωcm.

The CNF content is preferably from 0.1 to 2 mass % based on the sum total of the conductive composition, and in order to achieve both dispersibility and conductivity, more preferably from 0.5 to 1 mass %. This range varies depending on the type of the battery and the active material does not have to fall within this range. The conductive agent may contain a conductive agent other than the above CNF. Such a conductive agent may include carbon black such as carbon fiber, artificial graphite, natural graphite, acetylene black, and furnace black, expanded graphite, metal powder, and the like. The CNF content may range between two values arbitrarily fall within any of the values selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, and 2.

As the catalyst for synthesis of the CNF of the present invention, an active species is preferably used that contains cobalt as a main component. The catalyst more preferably has an active species containing cobalt as a main component from 3 to 150 mass % supported on a carrier of a magnesium-containing oxide with a specific surface area from 0.01 to 5 $m^2/g$ (hereinafter, referred to as a cobalt-magnesium oxide supported catalyst) for synthesis of CNF. Cobalt may be contained in the form of, not only metal cobalt, a compound, such as an oxide, a hydroxide, a hydrous oxide, a nitrate, an acetate, an oxalate, and a carbonate.

When the magnesium-containing oxide is used as the carrier for the active species, examples of the magnesium-containing oxide include magnesium oxide, magnesium-containing spinel oxide and perovskite oxide, and the like. Among them, magnesium oxide is most preferred as the carrier. The magnesium-containing oxide has a specific surface area preferably from 0.01 to 5 $m^2/g$ and more preferably from 0.01 to 3 $m^2/g$ for dispersibility of the CNF.

When cobalt is used as the active species, the support ratio is preferably from 3 to 150 mass %, most preferably from 5 to 120 mass %, and most preferably from 10 to 90 mass %. The support ratio of less than 3 mass % may cause poor conductivity of the CNF produced therefrom. The ratio of more than 150 mass % may cause an increase in particle size of the cobalt particles and thus a decrease in synthetic activity.

For supporting cobalt on the carrier, a support method is not particularly limited. For example, the carrier is impregnated in a non-aqueous solution (e.g., an ethanol solution) or an aqueous solution in which a salt of cobalt is dissolved for sufficient dispersion mixing, followed by drying and heating in air at high temperatures (300° C.-600° C.), thereby capable of supporting cobalt on the carrier. As another example, the carrier may be impregnated in a non-aqueous solution (e.g., ethanol) or an aqueous solution in which a salt of cobalt is simply dissolved for sufficient dispersion mixing, followed only by dehydration drying.

The CNF of the present invention preferably uses a carbon source of carbon monoxide. Carbon monoxide used as the raw material gas may be a mixed gas with carbon dioxide or hydrogen or may contain an inert gas, such as a nitrogen gas. Carbon monoxide has a partial pressure preferably from 0.04 to 0.98 MPa, more preferably from 0.05 to 0.3 MPa, and most preferably from 0.05 to 0.1 MPa. A carbon monoxide gas partial pressure of less than 0.04 MPa may cause a decrease in synthetic activity or a decrease in the crystallinity and the conductivity of CNF produced therefrom. A carbon monoxide gas partial pressure of higher than 0.98 MPa may cause a decrease in dispersibility of CNF produced therefrom and rapid deactivation of the catalyst, leading to a decrease in synthetic activity.

A hydrogen gas partial pressure is preferably 1%-100% based on a carbon monoxide gas partial pressure and more preferably 10%-100%. A hydrogen gas partial pressure of more than 100% to the carbon monoxide gas partial pressure may cause a decrease in the synthetic activity and a decrease in the crystallinity and the conductivity of CNF produced therefrom. A hydrogen gas partial pressure of less than 1% may cause deactivation of the catalyst in an early stage and a decrease in the synthetic activity. The hydrogen gas partial pressure relative to the carbon monoxide gas partial pressure may be calculated by the following equation.

Hydrogen Gas Partial Pressure to Carbon Monoxide Gas Partial Pressure=$X1/X2 \times 100$(%)

In the equation, X1 denotes a molar ratio of the hydrogen gas and X2 denotes a molar ratio of the carbon monoxide gas For example, for a mixed gas of raw material gas composition of $CO/H_2/N_2$=85/15/0, the hydrogen gas partial pressure relative to the carbon monoxide gas partial pressure may be calculated as Hydrogen Gas Partial Pressure to Carbon Monoxide Gas Partial Pressure=$15/85 \times 100$=18(%).

A total gas partial pressure in which an inert gas is added to the raw material gases of the carbon monoxide gas, hydrogen, and carbon dioxide is preferably less than 1.0 MPa. A total pressure of more than 1.0 MPa may increase the costs for high pressure resistant facilities and utilities in production. At a greatly reduced pressure compared with 0.1 MPa (atmospheric pressure), for example at less than 0.08 MPa, sealing to prevent mixing of the atmosphere (oxygen) into a reactor at high temperatures is sometimes difficult, and this is not preferred.

A carbon monoxide gas flow rate is preferably 1 NL/g-active species-min. or more. The carbon monoxide gas flow rate is set within this range to enable production of CNF with high synthetic activity. The high synthetic activity in this context specifically means 10 g-CNF/g-active species-h (hour) or more. Although the carbon monoxide gas flow rate has no particular upper limit, the rate of more than 200 NL/g-active species-min. causes a too high gas flow rate and increases the utility costs for the residual heat, and this is not preferred. In addition, the synthetic activity sometimes decreases.

"NL" denotes a gas volume L (liter) in terms of the normal state (0° C., 1 atm.), and "NL/g-active species-min." denotes a gas flow rate for 1 min. in the presence of unit active species (per gram of active species).

The reaction temperature for synthesis of CNF is preferably from 670° C. to 780° C. and more preferably from 700° C. to 750° C. The reaction temperature of less than 670° C. may cause a decrease in the crystallinity, the conductivity, and the dispersibility of CNF. The temperature of more than 780° C. may cause a decrease in the synthetic activity.

A production system for CNF synthesis includes known production methods and known production systems. For example, a fixed bed reactor, a fluidized bed reactor, a batch reactor, or a continuous reactor may be used.

From the CNF thus produced, the active species and the carrier are preferably removed to increase the purity. Removal of the active species and the carrier may be specifically performed by a method described in JP 2006-69850A and the like in which the CNF is dispersed in acid, such as hydrochloric acid, nitric acid, and sulfuric acid, followed by recovery of CNF by a technique, such as filtration and centrifugation.

Active Material

The active material used in the present invention is preferably selected from any one or more of $LiCoO_2$, $LiMn_2O_4$, $LiNiO_2$, $LiMPO_4$, $Li_2MSiO_4$, $LiNi_xMn_{(2-x)}O_4$, $Li(Mn_xNi_yCo_Z)O_2$, $Li(Al_xNi_yCo_Z)O_2$, and $xLi_2MnO_3$-(1-x)$LiMO_2$ (X in $LiNi_xMn_{(2-x)}O_4$ satisfies the relationship of 0<X<2, X, Y, and Z in $Li(Mn_xNi_yCo_Z)O_2$ or $Li(Al_xNi_yCo_Z)O_2$ satisfy the relationship of X+Y+Z=1 and also satisfy the relationship of 0<X<1, 0<Y<1, and 0<Z<1, x in $xLi_2MnO_3$-(1-x)$LiMO_2$ satisfies the relationship of 0<x<1, and M in $LiMPO_4$, $Li_2MSiO_4$, or $xLi_2MnO_3$-(1-x)$LiMO_2$ is one or more elements selected from Fe, Co, Ni, and Mn).

Binder

Examples of the binder include polyvinylidene fluoride (PVdF), polytetrafluoroethylene, a styrene-butadiene copolymer, a (meth)acrylate copolymer, polyvinyl alcohol, and a copolymer of polyvinyl alcohol and polyacrylonitrile. The polymer as the binder is not limited in structure, and may use a random copolymer, an alternating copolymer, a graft copolymer, a block copolymer, and the like. Among them, PVdF is preferred from the perspective of oxidation resistance.

Preparation of Conductive Composition for Electrode

The dispersion of the present invention having the CNF, the active material, and the binder is mixed with a solvent solution (dispersion) of a binding agent using a ball mill, a sand mill, a twin-screw kneader, a planetary centrifugal stirrer, a planetary mixer, a dispersion mixer, or the like to produce a slurry. The viscosity of the slurry may be adjusted using a viscosity modifier. Examples of the viscosity modifier include water soluble polymers, such as polyvinyl alcohol, carboxymethylcellulose and a salt thereof, methylcellulose and a salt thereof, and polymethacrylic acid and a salt thereof. Specific examples of the salt include alkali metal, such as sodium and potassium.

Electrode for Lithium Ion Secondary Battery

An electrode for lithium ion secondary battery (hereinafter, abbreviated as an electrode) may be produced by applying a slurry of the conductive composition for electrode of the present invention on a metal plate, drying it, and laminating a collector thereon. As the metal plate, aluminum is preferably used in many cases. As the metal plate for the anode collector, copper is preferably used in many cases. The metal plate preferably has a shape of, but not particularly limited to, foil. The metal plate preferably has a thickness from 5 to 30 μm for the ease of processability. The solvent used for the slurry is not particularly limited as long as the solvent is inert to the active material and is capable of being dissolved and dispersed in the binder. An example of the preferred solvent is N-methyl-2-pyrrolidone.

As the method of applying the slurry, a general method may be used. Examples of the method include reverse roll coating, direct roll coating, blade coating, knife coating, extrusion coating, curtain coating, gravure coating, bar coating, dip coating, and the squeeze technique. Among them, blade coating (comma roll or die cut), knife coating, and extrusion coating are preferred. Here, the application method is selected in accordance with the solution properties and the drying characteristics of the slurry to allow obtaining a good surface condition of the application layer. The application may be applied on one surface or both surfaces, and for application on both surfaces, the application may be carried out sequentially one surface after another or may be simultaneously on both surfaces. The application may be continuous, intermittent, or in stripes. The slurry may be applied in a thickness, a length, and a width that are appropriately determined in accordance with the battery size. For example, the electrode may have a thickness, including the thickness of the applied slurry, ranging from 10 μm to 500 μm.

As a method of drying the slurry applied on the metal plate, a generally employed method may be used. In particular, hot air, vacuum, infrared rays, far infrared rays, electron beam, and lower hot air are preferably used singly or in combination.

The electrode may be pressed as needed. As a pressing method, a generally employed method may be used. In particular, die stamping and calender press (cold or hot rolling) are preferred. In the calender press, the pressing pressure is preferably, but not particularly limited to, from 0.2 to 3 ton/cm.

Then, the solvent contained in the slurry is removed to form a conductive composition for electrode in which the CNF and the active material are bound to each other via a binder. Further, a composite collector and an electrode mixture layer are pressurized by roll pressing or the like for tight adhesion to produce a target electrode.

EXAMPLES

Although specific descriptions are given below to the present invention with Examples and Comparative Examples, the present invention is not limited to them.

Preparation of CNF Synthesis Catalyst

Cobalt nitrate hexahydrate (3N5 produced by Kanta Chemical Co., Inc.) was weighed to 6.17 g and dissolved in 30 g of a mixed solvent of distilled water and ethanol at a mass ratio of 2:1. To the aqueous cobalt nitrate solution, 2.5 g of magnesium oxide (DENMAG® KMAOH-F produced by Tateho Chemical Industries Co., Ltd.) with a specific surface area of 0.61 m²/g was added and stirred for 1 hour in a state of being maintained at 50° C. in a water bath. After stirring, water was evaporated by an evaporator. The solid component thus produced was vacuum dried at 60° C. for 24 hours, and then sintered at 400° C. for 5 hours. After sintering, the solid component thus produced was ground in an agate mortar to produce a cobalt-magnesium oxide supported catalyst on which 50 mass % of cobalt metal was supported.

Synthesis of CNF-A

As a raw material, carbon monoxide of grade G1 (99.95% purity) purchased from Suzuki Shokan Co., Ltd. was used.

In a quartz reaction tube, a catalyst holder was provided that was charged with the cobalt-magnesium oxide supported catalyst with a support ratio of 50% produced in the above catalyst preparation with an active species content of 5 mg and the reaction tube was purged with nitrogen by sufficient flow of nitrogen. Further, a reducing gas of 80% nitrogen and 20% hydrogen was raised to a temperature of 680° C. shown in Table 1 at atmospheric pressure (101 kPa), and after the temperature reached 680° C., the gas was maintained for 30 min. for catalyst reduction. Subsequently, a raw material gas with a carbon monoxide gas partial pressure of 0.086 MPa and a hydrogen gas partial pressure of 0.015 MPa was flown through a catalyst layer at a carbon monoxide gas flow rate of 13 NL/g-active species-min. for reaction for 1 hour. The raw material gas was then switched to a nitrogen gas to be cooled immediately. In the description below, the CNF produced in the present production conditions is referred to as CNF-A.

Synthesis of CNF-B

CNF was synthesized by the same method as the production of CNF-A other than changing the reaction temperature to 700° C. In the description below, the CNF produced in the present production conditions is referred to as CNF-B.

TABLE 1

| | Catalytic Species | | | | Raw | Carbon | Carbon | | |
|---|---|---|---|---|---|---|---|---|---|
| | Active Species | Carrier Species | Specific Surface Area of Carrier [m²/g] | Support Ratio [%] | Reaction Temperature [° C.] | Material Gas Composition (Molar Ratio) | Monoxide Gas Partial Pressure [MPa] | Monoxide Gas Flow Rate [Note 1] | Synthetic Activity [Note2] | Catalytic Activity [Note3] |
| CNF-A | Cobalt | Magnesium Oxide | 0.61 | 50 | 680 | $CO/H_2/N_2 =$ 85/15/0 | 0.086 | 13 | 24 | 7 |
| CNF-B | Cobalt | Magnesium Oxide | 0.61 | 50 | 700 | $CO/H_2/N_2 =$ 85/15/0 | 0.086 | 13 | 24 | 7 |

Note 1:
[NL/g-active species-min.]
Note 2:
[g-CNF/g-active species-h]
Note 3:
[g-CNF/g-catalyst-h]

Catalyst Removal

The synthesized CNF contained magnesium oxide used as a carrier and the active species. Since catalytic activity of less than 3 g-CNF/g-active species-h might increase the amounts of magnesium oxide and the active species in the CNF produced by the synthesis and affect the conductivity and the dispersibility, magnesium oxide and the active species were removed. First, 2 g of the synthesized CNF was put in 400 mL of 2 mol/L hydrochloric acid and subject to dispersion process at a rotation speed of 7000 rpm for 10 min. using ROBOMIX F model manufactured by PRIMIX Corp. and HOMO MIXER MARK 2-2.5 model for the stirrer. The CNF-containing hydrochloric acid was then subject to centrifugation. The supernatant was discarded and distilled water was added and stirred. The series of operation was repeated until no chloride ions in the supernatant were detected by an aqueous silver nitrate solution. The solid content was then dried under a reduced pressure at 110° C. for 13 hours.

After removal of magnesium oxide and the active species, Raman spectrometry was carried out to obtain a D/G value, and moreover, the powder resistivity, the specific surface area, and the median diameter were measured. Results are shown in Table 2.

Average Fiber Diameter

Using the value of the specific surface area obtained by the above method, an average fiber diameter of the CNF was calculated from the following equation. The density of the CNF was assumed 1.8 g/cm³ based on a non-patent literature, Composites: Part A, 41 (2010), 1345-1367. Calculation results are shown in Table 2.

Average Fiber Diameter $(nm) = 1000 \times 4/(\rho \times S)$

In this equation, $\rho$ denotes the density (g/cm³) of the CNF and S denotes the specific surface area (m²/g) of the CNF.

Powder Resistivity

The volume resistivity of the CNF powder was obtained by four probe method in conditions of an atmosphere at 23° C. and relative humidity of 50% under a load of 9.8 MPa using Loresta GP: powder resistivity measurement system MCP-PD51 model manufactured by Mitsubishi Chemical Analytech Co., Ltd. For the measurement, a 100 mg sample was used.

D/G Value by Raman Spectrometry

Raman spectrometry of the CNF powder was carried out using a microscopic laser Raman spectrometer (Niolet Almega-XR manufactured by Thermo Fisher Scientific

TABLE 2

| Type of Conductive Agent | | Example 1 CNF-A | Example 2 CNF-B | Comparative Example 1 CNF Flotube9000 | Comparative Example 2 CNF NC7000 | Comparative Example 3 Carbon Black-A | Comparative Example 4 Carbon Black-B |
|---|---|---|---|---|---|---|---|
| Conductive Agent Properties | Powder Resistivity [Ω-cm] | 0.025 | 0.018 | 0.023 | 0.03 | 0.088 | 0.063 |
| | D/G Value | 0.7 | 0.7 | 1.7 | 1.8 | 1.7 | 2.4 |
| | Median Diameter [μm] | 0.50 | 0.52 | 43 | 15 | 0.3 | 0.3 |
| | Specific Surface Area [m2/g] | 92 | 88 | 241 | 220 | 133 | 39 |
| | Average Fiber Diameter [nm] | 26 | 25 | 9.2 | 11 | — | — |
| Conductive Material Composition | CNF [mass %] | 1 | 1 | 1 | 1 | 0 | 0 |
| | Carbon Black [mass %] | 0 | 0 | 0 | 0 | 1 | 1 |
| | LiCoO₂ [mass %] | 98 | 98 | 98 | 98 | 98 | 98 |
| | PVdF [mass %] | 1 | 1 | 1 | 1 | 1 | 1 |
| Cathode Slurry Evaluation Results | Solid Content [%] | 75 | 75 | 70 | 75 | 80 | 80 |
| | Plate Resistance [Ω] | 43 | 37 | 65 | 424 | 60 | 520 |
| | Discharge Rate Characteristics 0.2 C/5 C [%] | 63 | 70 | 50 | 44 | 60 | 49 |

The CNF and carbon black used in Examples and Comparative Examples were evaluated in accordance with the following methods.

Specific Surface Area

A specific surface area of the CNF powder was obtained by BET single point method in accordance with JIS K6217-2 using Macsorb HM model-1201 manufactured by Mountech Co., Ltd.

K.K., laser at 532 nm). The D band (D1: peak position 1330 cm-1, D3: 1500 cm-1, D4: 1150 cm-1) and the G band (G+: 1600 cm-1, G-: 1570 cm-1) were subjected to waveform separation, and then a ratio (D/G value) of the total area derived from the D band peak to the total area derived from the G band peak was obtained. A lower D/G value indicates higher crystallinity of the CNF.

REFERENCE

D1: derived from point defects in the graphite crystal structure and defects derived from crystal edges
D3: derived from amorphous carbon
D4: derived from polyene and ionic impurities
G+: graphite crystalline peak in longitudinal optical mode
G−: graphite crystalline peak in transverse optical mode Dispersibility Evaluation: Particle Size Distribution Measurement by Laser Diffraction/Scattering (ISO 13320: 2009)

Dispersibility was evaluated with a particle size distribution analyzer (LS 13 320 universal liquid module manufactured by Beckman Coulter, Inc.).

Prior to measurement of the ratio of dispersed particles of 1 μm or less and the median diameter D50 value, the particle size distribution analyzer was inspected. When the median diameter D50 value obtained from measurement of each calibration sample below satisfied all the criteria below, measurement accuracy of the analyzer was assessed as satisfactory to perform particle size distribution measurement in Examples and Comparative Examples.

Preparation of Aqueous Dispersion Medium

To 100 mL of distilled water, 0.10 g of sodium carboxymethylcellulose (hereinafter, referred to as CMCNa) was added and stirred at ordinary temperature for 24 hours or more and dissolved to prepare an aqueous dispersion medium of 0.1 mass % CMCNa.

Preparation of Aqueous CMCNa Solution

To 100 mL of distilled water, 2.0 g of CMCNa was added and stirred at ordinary temperature for 24 hours or more and dissolved to prepare an aqueous solution of 2.0 mass % CMCNa.

Preparation and Inspection of Calibration Samples (1) Inspection with Polystyrene Dispersion LATRON 300LS (median diameter D50 value of 0.297 μm), an aqueous dispersion for calibration of measurement accuracy, was used, which is an accessory to the particle size distribution analyzer (LS 13 320 universal liquid module manufactured by Beckman Coulter, Inc.).

An optical model was set for the respective refractive indices of 1.600 for polystyrene and 1.333 for water, and after the end of washing the module, approximately 1.0 mL of the aqueous CMCNa solution was filled. In a condition of a pump speed of 50%, offset measurement, optical axis adjustment, and background measurement were carried out, followed by particle size distribution measurement by applying LATRON 300LS to the particle size distribution analyzer in such a manner that a relative concentration indicating percentage of light scattering outside the beam due to the particles was from 8% to 12% or PIDS (polarization intensity differential scattering) was from 40% to 55%. A graph of volume % to a particle size (particle diameter) was obtained to inspect the accuracy. The median diameter D50 value obtained from the measurement was confirmed to fall within a range of 0.297 μm+0.018 μm, the D10 value within 0.245 μm±0.024 μm, and the D90 value within 0.360 μm+0.036 μm.

(2) Inspection with Alumina Dispersion

In a vial, 0.120 g each of alumina LS-13 (median diameter D50 value of 45 μm) produced by Denka Company Limited and alumina AS-50 (median diameter D50 value of 6.7 μm) produced by Showa Denko K.K. were weighed and 12.0 g of the aqueous dispersion medium was added, and then the vial was shaken well to prepare an aqueous alumina dispersion.

An optical model was set for the respective refractive indices of 1.768 for alumina and 1.333 for water, and after the end of washing the module, approximately 1.0 mL of the aqueous CMCNa solution was filled. In a condition of a pump speed of 50%, offset measurement, optical axis adjustment, and background measurement were carried out, followed by particle size distribution measurement by applying the aqueous alumina dispersion thus prepared to the particle size distribution analyzer in such a manner that a relative concentration indicating percentage of light scattering outside the beam due to the particles was from 8% to 12% or PIDS was from 40%/o to 55%. A graph of volume % to a particle size (particle diameter) was obtained to inspect the accuracy. The median diameter D50 value obtained from the measurement was confirmed to fall within a range of 48.8 μm+5.0 μm for LS-13 and 12.6 μm+0.75 μm for AS-50.

Premeasurement Process

In a vial, 6.0 mg of CNF was weighed and 6.0 g of the aqueous dispersion medium was added. For premeasurement process, an ultrasonic homogenizer Smurt NR-50 (manufactured by Microtec Co., Ltd.) was used.

The tip was confirmed not to be degraded and adjusted to be immersed in the process sample liquid, 10 mm or more from the fluid level. By setting TIME SET (irradiation time) as 40 sec., POW SET as 50%, and START POW as 50% (output 50%), automated power operation with a fixed output power was performed for ultrasonic irradiation, thereby homogenizing to prepare an aqueous CNF dispersion.

CNF Particle Size Distribution Measurement

Using the aqueous dispersion prepared by the above method, a ratio of dispersed particles of 1 μm or less and a median diameter D50 value of CNF were measured in accordance with the following method. An optical model of the LS 13 320 universal liquid module was set for the respective refractive indices of 1.520 for CNF and 1.333 for water, and after the end of washing the module, approximately 1.0 mL of an aqueous CMCNa solution was filled. In a condition of a pump speed of 50%, offset measurement, optical axis adjustment, and background measurement were carried out, followed by applying the aqueous CNF dispersion thus prepared to the particle size distribution analyzer in such a manner that a relative concentration indicating percentage of light scattering outside the beam due to the particles was from 8% to 12% or PIDS was from 40% to 55%, and ultrasonic irradiation (premeasurement process) at 78 W for 2 min. by an accessory to the particle size distribution analyzer and then circulation for 30 sec. to remove bubbles for particle size distribution measurement. A graph of volume % to a particle size (particle diameter) was obtained to determine a ratio of the presence of dispersed particles of 1 μm or less and a median diameter D50 value.

The particle size distribution was measured by collecting three measurement samples at different collection sites per CNF sample to obtain average values of ratios of the presence of dispersed particles of 1 μm or less and median diameter D50 values.

Example 1

Preparation of Cathode Slurry

First, N-methylpyrrolidone (produced by Kanta Chemical Co., Inc., hereinafter referred to as NMP) as a solvent, $LiCoO_2$ (average primary particle size of 20 μm) as a cathode active material, polyvinylidene fluoride (hereinafter, referred to as PVdF, molecular weight of approximately 300 thousand) as a binder, and CNF-A synthesized as above as a conductive agent were prepared.

Next, PVdF was weighed to 1 part by mass of the solid content and CNF to 1 part by mass of the solid content and they were mixed. The mixture was added to NMP and stirred to uniformity.

Further, LiCoO$_2$ powder was weighed to 98 parts by mass of the solid content and added to the above mixture and stirred to uniformity to produce a cathode slurry.

Evaluation of Cathode Slurry

Solid Content of Cathode Slurry

In an aluminum container, 2 mL of the prepared cathode slurry was charged and left at atmospheric pressure at 105° C. for 5 hours to evaporate NMP. Then, the solid content was evaluated from the mass ratio of the mass after NMP evaporation to the mass before NMP evaporation.

Solid Content=$M2/M1\times100$(%)

In the equation, M1 denotes the mass before NMP evaporation and M2 denotes the mass after NMP evaporation.

Preparation of Cathode

The cathode slurry thus prepared was then subject to film formation on aluminum foil using an applicator and left still in a drier for predrying at 80° C. for 10 min. and further at 105° C. for 1 hour. It was then pressed by a roll press at a linear pressure from 0.2 to 3 ton/cm for preparation of a film including the aluminum contain with a thickness of 60 μm. To completely remove volatile components such as the residual solvent and adsorbed moisture, it was vacuum dried at 170° C. for 3 hours to produce a cathode sheet. The cathode sheet was punched in a circular shape with a diameter of 14 mm to produce a cathode.

Evaluation of Cathode

Plate Resistance of Cathode

The cathode thus prepared was sandwiched by a cell of stainless steel to measure alternating current impedance at an amplitude voltage of 10 mV and a frequency ranging from 1 Hz to 100 kHz using an alternating current impedance measuring device (manufactured by Solartron Metrology). The resistance component thus obtained was used as plate resistance.

Preparation of Anode

Li metal with a thickness of 0.5 mm was punched in a circular shape with a diameter of 15 mm to make an anode.

Preparation of Lithium Ion Secondary Battery

A lithium ion secondary battery was prepared in a 2032 coin cell. For the coin cell, a half cell with a counter electrode of lithium metal was used.

Between the cathode and the anode thus produced, a polypropylene/polyethylene multilayer microporous film separator was inserted that had a thickness of 20 μm and a diameter of 16 mm. Then, 1 mL of a non-aqueous solution based electrolyte (ethylene carbonate/diethyl carbonate=1/2 (mass ratio) mixed solution) in which LiPF$_6$ as an electrolyte at a concentration of 1 mol/L was dissolved was poured and then tightly sealed by closing the coin to prepare a lithium secondary battery. The lithium ion secondary battery thus prepared was subject to battery performance evaluation by the following method.

Evaluation of Lithium Ion Secondary Battery

Discharge Rate Characteristics (High Rate Discharge Capacity Retention)

The lithium ion secondary battery thus prepared was charged at a constant current and a constant voltage at 25° C. with a limit of 4.2 V and 0.2 ItA (0.666 mA), followed by discharge at a constant current of 0.2 ItA to 2.5 V.

The discharge current was then changed to 0.2 ItA, 0.5 ItA, 1 ItA, 2 ItA, 3 ItA, and 5 ItA to measure the discharge capacity for each discharge current. As recovery charge in each measurement, the battery was charged at a constant current and a constant voltage of 4.2 V. The high rate discharge capacity retention of discharge at 5 ItA to discharge at 0.2 ItA was calculated.

Example 2

A cathode slurry was prepared in the same manner as in Example 1 other than using CNF-B as the conductive agent. Results are shown in Table 2.

Comparative Example 1

A cathode slurry was prepared in the same manner as in Example 1 other than using CNF (Flotube9000) produced by Cnano Technology Ltd. as the conductive agent. The CNF had a D/G value of 1.7 and a median diameter D50 value of 43 μm, and the plate resistance was resulted poorer than Examples 1 and 2. Results are shown in Table 2.

Comparative Example 2

A cathode slurry was prepared in the same manner as in Example 1 other than using CNF (NC7000) produced by Nanocyl SA as the conductive agent. The CNF had a D/G value of 1.8 and a median diameter D50 value of 15 μm, and the plate resistance was resulted poorer than Examples 1 and 2. Results are shown in Table 2.

Comparative Example 3

A cathode slurry was prepared in the same manner as in Example 1 other than using carbon black-A (specific surface area of 133 m$^2$/g and DBP oil absorption of 267 mL/100 g) as the conductive agent. The CB had a D/G value of 1.7 and powder resistivity of 0.088 cm, and the plate resistance was resulted poorer than Examples 1 and 2. Results are shown in Table 2.

Comparative Example 4

A cathode slurry was prepared in the same manner as in Example 1 other than using carbon black-B (specific surface area of 39 m$^2$/g and DBP oil absorption of 177 mL/100 g) as the conductive agent. The CB had a D/G value of 2.4 and powder resistivity of 0.063 cm, and the plate resistance was resulted poorer than Examples 1 and 2. Results are shown in Table 2.

As shown in Table 2, the cathodes using the electrode materials in Examples 1 and 2 had lower plate resistance compared with the cathodes using the electrode materials in Comparative Examples 1 to 4. Further, the lithium ion secondary batteries using the electrode materials in Examples 1 and 2 had relatively good discharge rate characteristics, allowing the electrode materials in Examples of the present invention to lower a voltage decrease due to the discharge and lower a capacity decrease due to the increase in discharge current.

The invention claimed is:

1. A conductive composition for electrode, comprising: carbon nanofiber with a median diameter D50 value by volume from 0.1 to 3 μm; an active material; and a binder, wherein a content of the carbon nanofiber is from 0.1 to 1.5 mass % based on a sum total.

2. The composition of claim 1, wherein the carbon nanofiber further has powder resistivity of, measured under a load of 9.8 MPa, 0.03 Ωcm or less and D/G from 0.5 to 1.3.

3. The composition of claim 1, wherein the active material is selected from any one or more of $LiCoO_2$, $LiMn_2O_4$, $LiNiO_2$, $LiMPO_4$, $Li_2MSiO_4$, $LiNi_XMn_{(2-X)}O_4$, $Li(Mn_XNi_Y Co_Z)O_2$, $Li(Al_XNi_YCo_Z)O_2$, and $xLi_2MnO_3\text{-}(1-x)LiMO_2$, where X in $LiNi_XMn_{(2-X)}O_4$ satisfies relationship of $0<X<2$, X, Y, and Z in $Li(Mn_XNi_YCo_Z)O_2$ or $Li(Al_XNi_YCo_Z)O_2$ satisfy relationship of $X+Y+Z=1$ and also satisfy relationship of $0<X<1$, $0<Y<1$, and $0<Z<1$, x in $xLi_2MnO_3\text{-}(1-x)LiMO_2$ satisfies relationship of $0<x<1$, and M in $LiMPO_4$, $Li_2MSiO_4$, or $xLi_2MnO_3\text{-}(1-x)LiMO_2$ is one or more elements selected from Fe, Co, Ni, and Mn.

4. The composition of claim 1, wherein the binder is selected from any one or more of polyvinylidene fluoride, polytetrafluoroethylene, a styrene-butadiene copolymer, a (meth)acrylate copolymer, polyvinyl alcohol, and a copolymer of polyvinyl alcohol and polyacrylonitrile.

5. The composition of claim 1, wherein
the carbon nanofiber is carbon nanofiber produced using a catalyst having an active species containing cobalt as a main component, and using carbon monoxide as a carbon source;
the catalyst has the active species from 3 to 150 mass % supported on a carrier of a magnesium-containing oxide with a specific surface area from 0.01 to 5 $m^2/g$; and
the carbon nanofiber is produced in conditions of a reaction temperature from 670° C. to 780° C., a carbon monoxide partial pressure from 0.04 to 0.98 MPa, a hydrogen partial pressure from 1% to 100% based on the carbon monoxide partial pressure, and a carbon monoxide gas flow rate of 1 NL/g-active species-min. or more.

6. An electrode for lithium ion secondary battery, comprising the composition of claim 1.

7. A lithium ion secondary battery, comprising the electrode for lithium ion secondary battery of claim 6.

* * * * *